A. S. CUBITT.
MOTOR CONTROL SYSTEM.
APPLICATION FILED MAY 16, 1910. RENEWED NOV. 8, 1911.

1,019,428.

Patented Mar. 5, 1912.

WITNESSES:
J. Earl Ryan
J. Ellis Glen

INVENTOR:
ARCHIBALD S. CUBITT
BY Albert G. Davis
HIS ATTORNEY

UNITED STATES PATENT OFFICE.

ARCHIBALD S. CUBITT, OF PITTSFIELD, MASSACHUSETTS, ASSIGNOR TO GENERAL ELECTRIC COMPANY, A CORPORATION OF NEW YORK.

MOTOR-CONTROL SYSTEM.

1,019,428.         Specification of Letters Patent.         Patented Mar. 5, 1912.

Application filed May 16, 1910, Serial No. 561,682. Renewed November 8, 1911. Serial No. 659,248.

*To all whom it may concern:*

Be it known that I, ARCHIBALD S. CUBITT, a subject of the King of Great Britain, residing at Pittsfield, county of Berkshire, State of Massachusetts, have invented certain new and useful Improvements in Motor-Control Systems, of which the following is a specification.

My invention relates to the control of dynamo-electric machines, and particularly to contactor systems of motor control in which the successive closing of a plurality of contactors effects certain connections in the power circuit.

In many systems of motor control in which a plurality of electromagnetically controlled switches or contactors are arranged for operation in succession to cut out section by section resistance interposed in the motor circuit on starting, devices have been employed which coöperate with these contactors and temporarily interrupt the actuating circuits for the latter between the operation of successive contactors in order to prevent too rapid acceleration of the motor. Among these devices is the well-known "notching relay" which is provided with a coil connected in series with its contacts and arranged in the actuating circuit for the contactors, another coil being provided on the relay and energized by motor current for holding the relay open if the current in the motor circuit exceeds a certain value. With such a relay the actuating circuit is interrupted automatically after each resistance controlling contactor closes and is maintained open thereafter as long as the current in the motor exceeds a certain critical value as it may, and generally does, for a short interval after the cutting out of a section of resistance. It has been the custom to use, in connection with such relays, a dash-pot which serves to delay the falling of the core both for the purpose of giving the magnetic flux of the series or motor current coil on the relay time to build up and become effective for holding the core in its raised position and for the purpose of insuring a certain minimum interval between the operation of successive contactors. Systems of motor control are also known in which, instead of a single actuating circuit for the resistance controlling contactors, a plurality of such circuits leading to alternate contactors are used and means is provided for causing the energization of these circuits alternately under the control, as to rate, of the current in the motor circuit. One form of such a system of control is shown and claimed in my Patent No. 941,408 dated November 30, 1909, and assigned to the same assignee as the present application. In this system of control dash-pots have often been employed in connection with the retarding or notching relays to delay the cores of the latter in falling for the same reasons as in the single actuating wire control systems above mentioned.

In both the "single wire" and "two wire" systems just referred to, the notching relays are retarded in closing, after the current in their holding coils has dropped below the critical value, and the so-called "time limit" of the relay is supplementary to the "current limit." It is often undesirable that the successive closing of the resistance controlling contactors be delayed after the current in the motor circuit has ceased to exceed the critical value, and it is an object of my invention to provide means whereby the "time limit" of the retarding device is made to date from the time said device interrupts the actuating circuit instead of from the time when the motor current falls below the critical value.

In carrying out the objects of my invention, as above mentioned, I provide a new and improved form of relay distinguished by certain features hereinafter pointed out. While I have shown this type of relay as embodied in a control system of the kind set forth in my patent above mentioned, I do not wish to be understood as limiting it to this use, since it will be obvious to those skilled in the art that my invention may be embodied in many other kinds of electrical apparatus.

Figure 1:
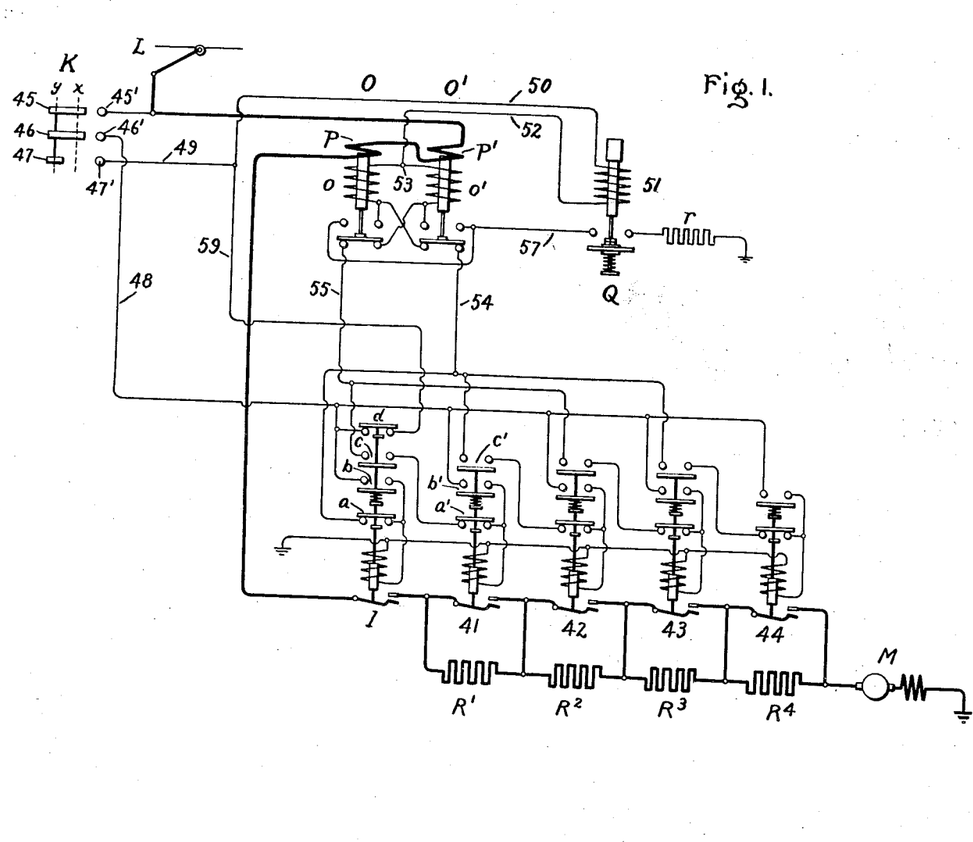
Figures 1, 2, 3 and 4 show diagrammatically systems of motor control of the general type covered by my patent, above referred to, having my invention embodied therein.
Figure 2:
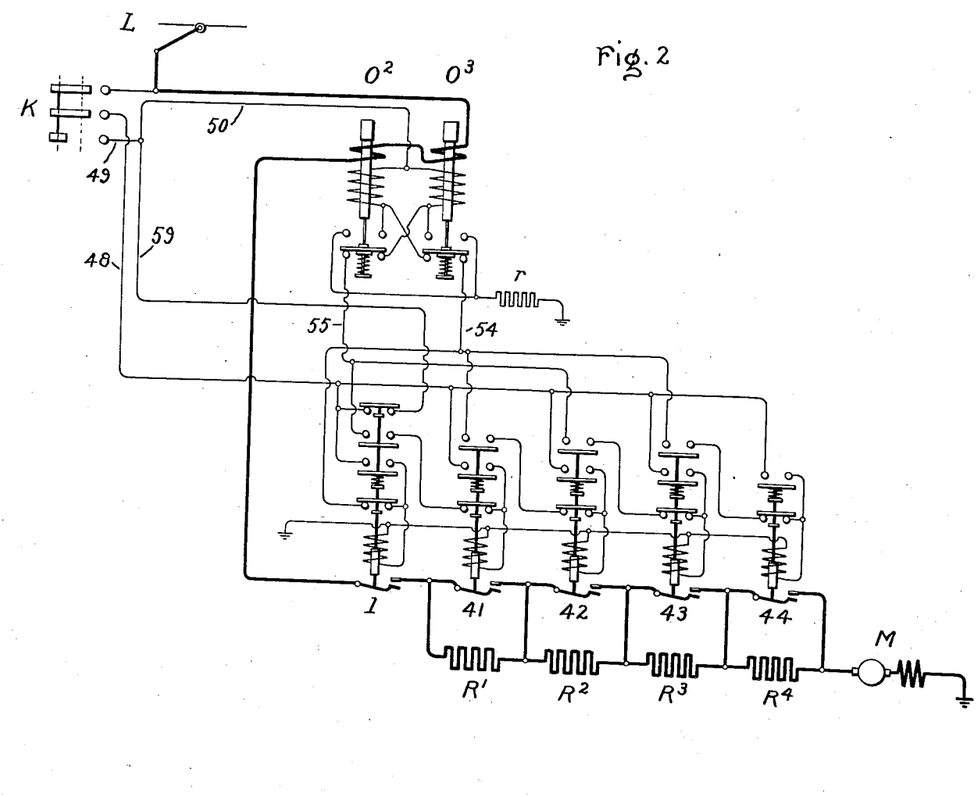
Figure 3:
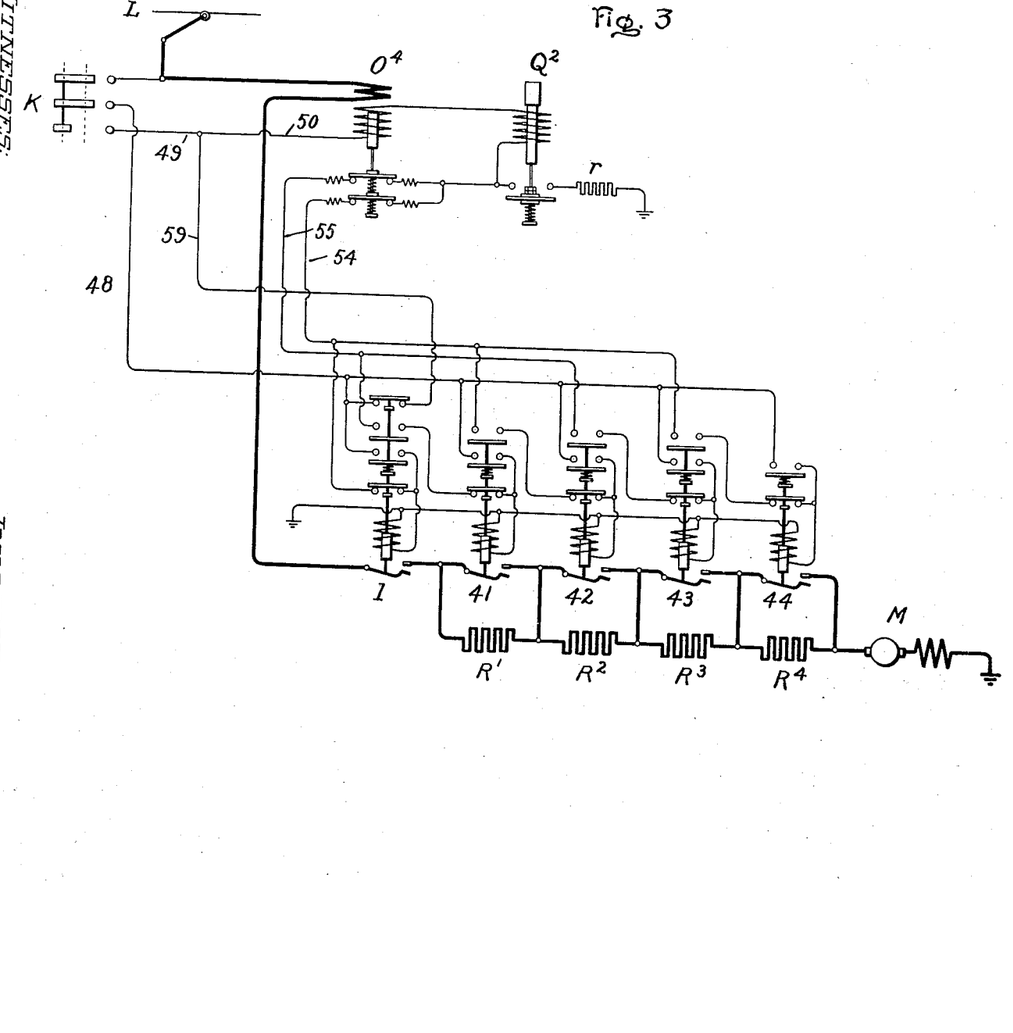
Figure 4:
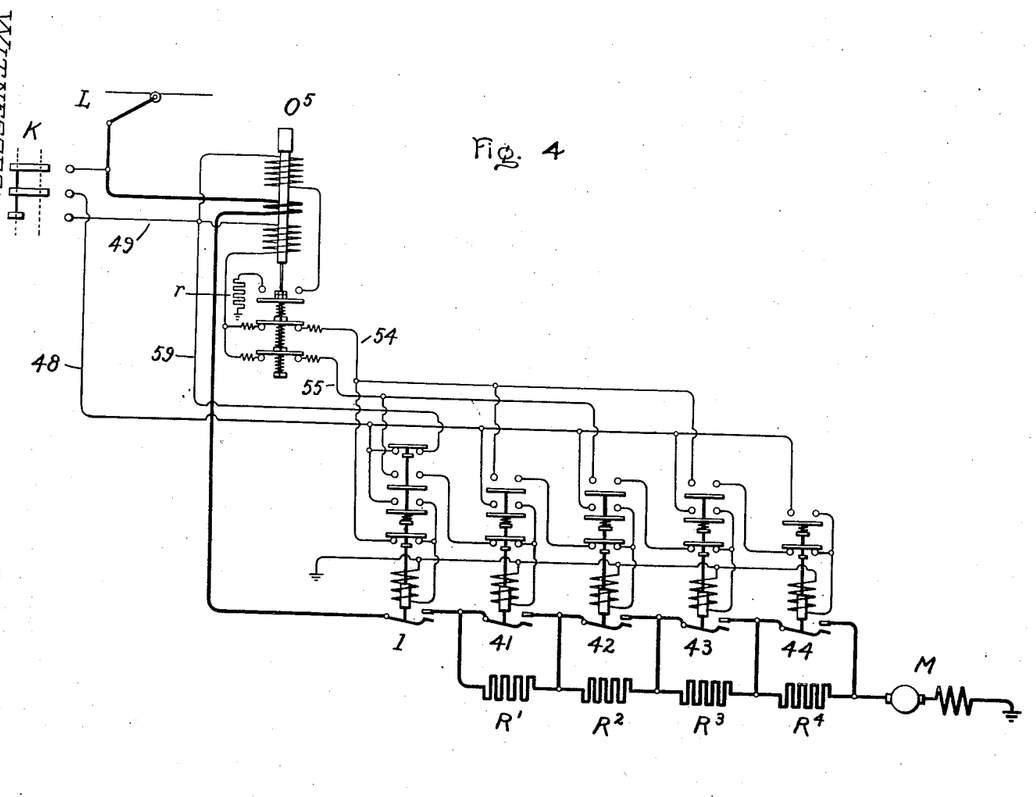
Figure 5:
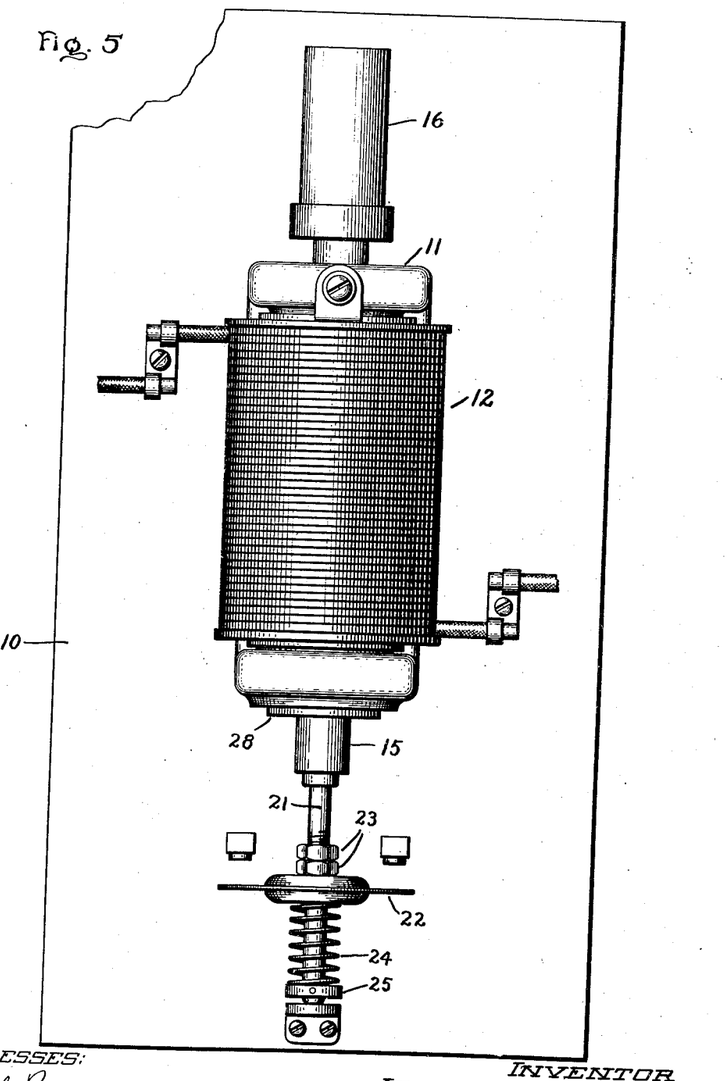
Fig. 5 is a front elevation of the relay shown in Figs. 1 and 3 provided with a dash-pot.
Figure 6:
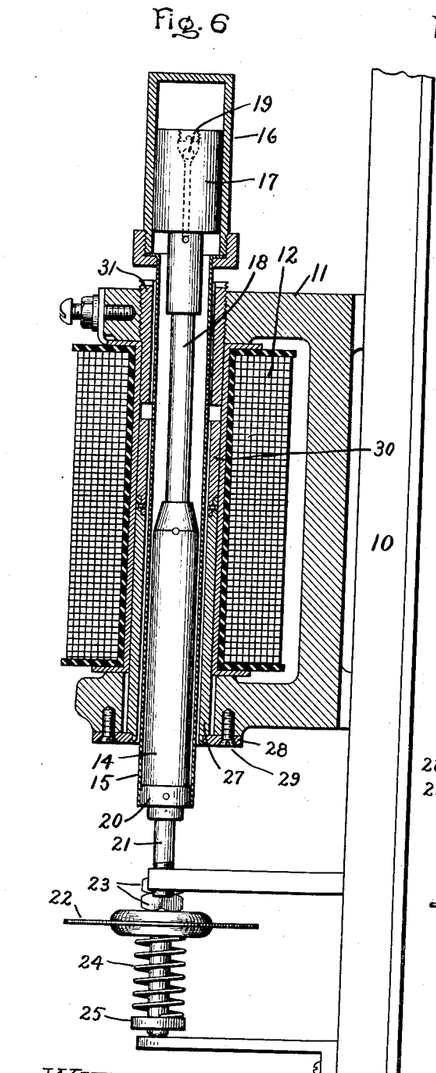
Fig. 6 is a front elevation, partly in section, of the relay shown in Fig. 5.

Before proceeding to describe the systems of motor control shown in Figs. 1 to 4 it is desirable that an understanding be had of the construction and mode of operation of the relay illustrated in Figs. 5 to 8 which is employed in the systems of Figs. 1 and 3 and which is found in a modified form in the systems of Figs. 2 and 4. A description of this relay construction will, therefore, first be given.

Referring to Figs. 5 to 8, the parts of the relay are shown as mounted upon a backboard 10 of suitable material, such as slate. The field frame of the relay is shown at 11 and within this frame is mounted a coil 12 which, when energized, furnishes the magnetic field into which the core of the relay moves. The core of magnetic material is shown at 14 as inclosed in a brass tube 15, to the top of which is secured a cylinder member 16 of a dash-pot, within which moves a piston 17 secured to a rod 18 extending upwardly from the top of the core 14, as clearly shown. The piston 17 is provided with a valve of any well-known form, such as the ball valve 19, which allows air to escape freely from below the piston to the space above the same but retards the flow of air in the opposite direction. The bottom of the tube 15 is filled by a plug 20 from which a rod 21 extends downwardly. On this rod is carried a contact disk 22 of well-known form. The contact disk is slidable upon the rod 21 and is yieldingly held against the nuts 23 by the spring 24 which at its lower end rests upon a collar 25 secured to the rod 21. The hole in the magnet frame and the actuating coil in which the tube 15 moves is lined with the brass tube 27, supported as shown on the movable washer 28 secured to the bottom of the frame 11 by the screws 29, this tube 27 having secured to it at its upper end an iron tube 30 arranged as shown. Another iron tube 31, the position of which may be adjusted in the top leg of the field frame 11, projects downwardly toward the tube 30. By adjusting the position of the tube 31 with reference to the tube 30 the air gap between these may be regulated and the magnetic effect of the coil 12 on the core 14 at a certain current may be adjusted. The core 14 may be tapered at its upper end, as shown, and when so constructed will allow the core to be held in its raised position at different points by the same current in the actuating coil. This particular construction of magnetic field structure and core is, however, no part of my invention but is covered in a co-pending application in the name of Eugene R. Carichoff, Serial No. 504,321, filed June 25, 1909, and assigned to the same assignee as this application.

Figures 7, 8:
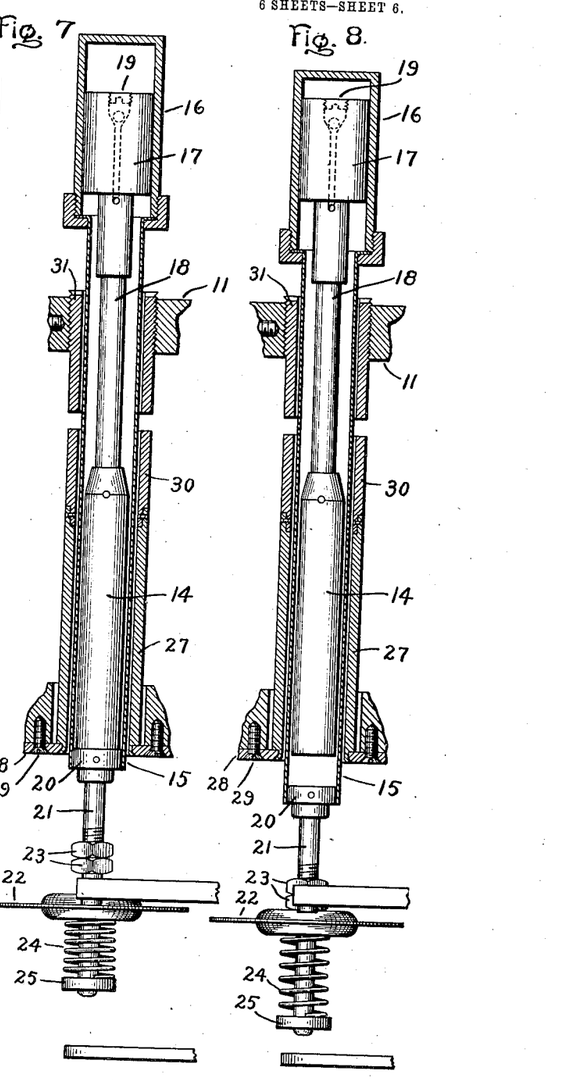
Fig. 7 is a fragmentary view, similar to Fig. 6, showing the relay just after the movable member has been raised.
Fig. 8 is a view, similar to Fig. 6, showing the position of the parts of the relay a certain time after the raising of the core.

The operation of the relay shown in Figs. 5 to 8 is as follows: When the coil 12 is energized the core 14 is attracted upward and in rising carries with it the shell 15 owing to the dash-pot connection between the core and said shell. Fig. 7 shows the core in its raised position and the shell in the position in which it is just after the core has pulled up; the contact disk 22 has been raised into engagement with its coöperating fixed contacts and the spring 24 beneath the disk has been put under compression. Immediately after the core has moved to its upper position, the shell 15 and the parts carried thereby begin to drop under the retarding effect of the dash-pot, this movement being induced both by gravity and by the expansion of the spring 24. The falling of the shell 15 may continue until the disk 22 drops out of engagement with its coöperating fixed contacts, as shown in Fig. 8, and if the energization of the magnet coil 12 is dependent upon the circuit through these contacts said coil may be deënergized when the shell 15 reaches the position shown in Fig. 8 and the core 14 may drop, thereby returning the relay parts to the position illustrated in Figs. 5 and 6. The valve in the piston of the dash-pot of course allows air to escape freely from below the piston to above it and permits the core to drop freely within the shell when it is released by the deënergization of the magnetizing coil.

I will now describe the system of motor control illustrated in Fig. 1 in which is employed the relay just described and shown in Figs. 5 to 8.

In Fig. 1, the motor to be controlled is indicated at M. $R'$ to $R^4$ are a plurality of resistances arranged to be interposed in the motor circuit in starting and to be short-circuited respectively by the electrically controlled switches or contactors 41 to 44 which may be of any well-known and suitable form. A source of current supply is indicated at L, the other side of the source being ground. A line contactor $l$ when closed serves to connect the motor to the source through resistances $R'$ to $R^4$. A master-switch K, shown diagrammatically in the usual manner, may be of any well-known form, such as a drum controller, having segments 45, 46 and 47 which engage respectively with the fingers $45'$, $46'$ and $47'$. The segments 45, 46 and 47 are electrically connected and the finger 45' is connected to the source. The finger 46' is connected to a wire 48 which serves both as an actuating circuit for the line switch L and as a maintaining circuit for all the switches $l$ and 41 to 44, as will be hereinafter explained. The actuating circuit for the resistance controlling contactors 41 to 44 leads from the finger 47', through the wire 49, wire 50, coil 51 of the relay Q, which is of the kind shown in Figs. 5 to 8, through wire 52, which branches at 53 into two wires 54 and 55 which serve as actuating circuits for contactors 42 and 44 and contactors 41 and 43. The wire 54 is connected in series with the actuating coil $o$ of the relay O and has interposed therein contacts closed by the relay O' when the same is deënergized. Similarly, the wire 55 is connected in series with the actuating coil $o'$ of the relay O' and in series with the lower contacts of the relay O. These relays O and O' may be of any well known and suitable form and may be provided respectively with heavy coils P and P' of few turns arranged in series with the motor circuit, as shown. These relays may be the same as those shown in Fig. 1 of my patent above referred to except that they are each provided with an upper pair of fixed contacts bridged by the contact disks when the relay cores are in their upper positions. By the upper contacts on the relays O and O' the actuating coils $o$ and $o'$ of these relays are respectively connected, when the core of the relay is up, to ground through the wire 57, the contacts closed by the relay Q and a resistance $r$. The purpose of this arrangement and its mode of operation will be hereinafter explained. The contactors $l$ and 41 to 44 operate auxiliary switches or "interlocks" of any well-known form, those illustrated being of the type in which contact disks carried by a rod moved by the contactor are brought into engagement with fixed contacts, these disks being connected to the rod by means of springs and collars in a well-known manner. This form of auxiliary switch has been illustrated merely because it lends itself particularly well to diagrammatic illustration. The purpose of the auxiliary switches and the order in which they close will be apparent from the drawing and from the following description of the mode of operation of the system.

The operation of the system of control shown in Fig. 1 is as follows: The master-switch K being turned to its first position $x$, current passes from the source L to the finger 45', through segments 45 and 46 to finger 46', through the wire 48, upper interlock $d$ on the contactor $l$, wire 59, wire 50, coil 51 of relay Q, wire 52, coil $o$ of relay O, lower contacts of relay O', wire 54, bottom interlock $a$ of contactor $l$, and through the actuating coil of contactor $l$ to ground. The relays Q and O, therefore, pull up and the contactor $l$ closes. Closing of contactor $l$ completes the motor circuit from the source L through the coils P and P' of the relays O and O', and through all the resistance R' to R⁴. The relays Q and O in pulling up complete a circuit from the actuating coil $o$ to ground, through the resistance $r$, but this resistance is large enough to cause enough current to flow through the actuating coil of the contactor $l$ to cause the latter to close. The contactor $l$ in closing closes the auxiliary switch $b$ and opens auxiliary switch $a$ which shifts the actuating coil of contactor $l$ from connection with actuating wire 54 to connection with the maintaining wire 48. At the same time the auxiliary switch $d$ opens and the auxiliary switch $c$ closes. The auxiliary switch $c$ in closing connects the actuating circuit for the contactor 41 to the actuating wire 55. The auxiliary switch $d$ in opening disconnects the wire 59 from the wire 48 and deënergizes the circuits feeding the coils of the relays Q and O. The movable members of these relays, therefore, immediately drop. As long as the master-switch K remains in the position $x$, no further change in the circuits will take place and the motor will operate with all of the resistance in circuit.

When the master-switch K is turned to its second position $y$, the finger 47' will engage with the segments 47 and will be connected to the source. The wire 50 will then receive current from the source through the wire 49 leading from finger 47', instead of through wire 59, auxiliary switch $d$, wire 48 and finger 46'. Current will, therefore flow through the wire 50, actuating coil 51 of relay Q, wire 52, actuating coil $o'$ of the relay O', lower contacts of relay O, wire 55, auxiliary switch $c$ of the line switch $l$, auxiliary switch $a'$ of contactor 41 and through the coil of said contactor to ground. The movable members of the relays Q and O', therefore, will pull up and the contactor 41 closes, short-circuiting the section of resistance R. The relays Q and O' complete their own maintaining circuit through the wire 57, and resistance $r$; and the contactor 41 in closing closes its auxiliary switches $b'$ and $c'$ and then opens its auxiliary switch $a'$, thereby completing a maintaining connection for the actuating coil of the contactor 41 to the wire 48, interrupting the connection of said actuating coil with the wire 55, and completing the actuating connection for the contactor 42 with the actuating wire 54. The contact member of the relay Q begins to drop immediately after pulling up, and after a certain interval of time interrupts the circuit which keeps the coil $o'$ of the relay O' energized leaving the core of the relay O' to be held up only by the magnetizing effect of the series coil P'. When the increase of current in the motor circuit, due to cutting out of resistance R', has fallen below a certain value, the magnetizing effect of coil P' is insufficient to hold the core of the relay O' up and it drops thereby closing the lower contacts of said relay and connecting the actuating wire 54 to the source. Energization of actuating wire 54 causes operation of the relays Q and O and closing of contactor 42 in a manner similar to that just described in connection with the closing of contactor 41. As long, therefore, as the master-switch K is left in its position $y$, the actuating wires 54 and 55 are alternately energized and the contactors 41 to 44 are successively closed. The "time limit" between the successive closing of these contactors 41 to 44 is given by the relay Q and the "current limit" by the relays O and O'. Since the time limit begins to run immediately after the pulling up of the relays and the closing of a contactor, the further operation of the system and closing of the next contactor will not be delayed after the time limit has expired unless the current in the motor circuit exceeds the critical value. In other words, the "time limit" and "current limit" of the system are independent of one another to the extent that while the means which gives the current limit is operative while the current in the motor circuit exceeds a certain value, the means which provides the time limit is operative only for a certain period of time dating from the closing of a contactor. The "time limit" and "current limit" thus date from the same time and are not cumulative as in the systems heretofore used mentioned above.

Of course in the system of Fig. 1, and also in the systems of Figs. 2, 3, and 4, hereinafter described, the master-controller K may be thrown in the first place directly to its second position $y$, whereupon the contactors $l$, and 41 to 44 will close in succession under the control of the limiting devices. Furthermore, with the form of master-switch and arrangement of circuits shown, the operator may at any time, by throwing the master-switch back from the position $y$ to the position $x$, stop the successive closing of the contactors and yet maintain closed those which have up to that time operated. Of course, if desired, a master-switch may be employed which has a segment for each of the resistance controlling contactors and which has as many positions as there are contactors, such switches being well-known in this art. I mention this merely to make it clear that my invention is equally applicable to speed regulating and to purely starting motor control systems.

In Fig. 2 is shown a system very similar to that of Fig. 1, the only difference being that the "time limit" device is embodied in the twin notching-relays themselves. The relays $O^2$ and $O^3$ of Fig. 2 are provided with the inclosed dash-pot arrangement hereinbefore described in connection with Figs. 5 to 8. The movable core of each relay is acted upon by the magnetizing effect of both its actuating coil and its series coil. Each of the relays $O^2$ and $O^3$ is so designed that when its contact core is held in its raised position by the magnetizing effect of its coils the shell which carries the movable contact disk is free to drop until the circuit through the upper contacts is opened, but not far enough to close the circuit at the lower contacts. When this mode of operation is kept in mind, it is evident that each of the relays $O^2$ and $O^3$ in pulling up completes a maintaining circuit for its actuating coil which is independent of the circuits through the actuating coils of the contactors and which is maintained completed for the certain definite interval of time during which the shell of the relay is dropping. After the shell of the relay has dropped far enough to open the upper contacts, the maintaining circuit of the actuating coil of said relay is deënergized and the holding of the core of the relay depends altogether upon the series coil. Of course if the current in the motor circuit does not exceed the critical value after the shell of the relay has dropped sufficiently to open the upper contacts, the core of the relay will drop carrying with it the shell and causing the lower contacts of the relay to be bridged by the contact disk. It is, therefore, evident that the system of Fig. 2 will operate in substantially the same manner as the system of Fig. 1 with the same advantages as those set forth in connection with that system.

In the system of Fig. 3 I have shown my invention as embodied in a system of the kind illustrated in Fig. 2 of my patent above referred to. In this system a separate time limit relay $Q^2$ is provided which completes a maintaining circuit for the actuating coil of the notching relay $O^4$ which said relay $Q^2$ maintains for a certain definite interval of time dating from the energization of the relays and the closing of a contactor. This relay $Q^2$ is exactly the same as the relay Q shown in Fig. 1 and the mode of operation of the system of Fig. 3 will be obvious from the drawing in view of the foregoing description of the mode of operation of the system of Fig. 1 and in view of the description in my patent above mentioned.

The system of Fig. 4 differs from that of Fig. 3 principally in that the notching relay itself is provided with the time limit device and the separate time limit relay is thus made unnecessary. The relay $O^5$ of Fig. 4 is shown as provided with three coils, two actuating coils and one holding or series coil, all of which produce a magnetic field which operates on the same movable core which is surrounded by a shell and is provided with a dash-pot arrangement of the kind above described in connection with Figs. 5 to 8. The upper contact of the relay $O^5$, which is closed when the core of the relay pulls up, completes a circuit through a resistance to ground from the upper coil on the relay, thereby causing energization of said coil. After the core of the relay has pulled up, the shell carrying the contact disks immediately begins to drop and at the lower limit of movement of said shell the upper contact disk has dropped out of engagement with its coöperating fixed contacts, thereby deënergizing the upper holding coil and making the holding up of the core dependent altogether upon the field produced by the series coil. As long, however, as the core is maintained in its upper position it is impossible for the shell to drop far enough to close the two lower sets of contacts and the actuating circuit for the next contactor is, therefore, not completed after the closing of the previous contactor and pulling up of the relay until the core of said relay is allowed to drop. Of course instead of the upper auxiliary actuating coil being used, the upper contacts on the relay might be arranged to complete a circuit to ground for the lower actuating coil. The mode of operation of the system of Fig. 4 will be obvious from the description of the other systems heretofore given.

In addition to the advantages hereinbefore set forth as being present in the relay construction and the systems herein described, I desire to point out that the dash-pot which gives the time element to the operation of the systems is particularly efficient because it is entirely inclosed and no dirt or moisture can, therefore, enter it and interfere with its proper operation. I regard this "inclosed dash-pot" construction as an important feature of the invention covered by this application and one which is capable of use in many connections.

While I have described several embodiments of my invention with much particularity, I do not wish to be considered as limited thereto since I aim, in the appended claims, to cover all other embodiments which are within the scope of my invention.

What I claim as new and desire to secure by Letters Patent of the United States, is,—

1. In combination, a plurality of contactors intended for operation in succession to effect certain connections in a power circuit, actuating circuits for said contactors, means limited by current in said power circuit for temporarily interrupting said actuating circuits between the operation of successive contactors, and means coöperating with said last-mentioned means for preventing the reëstablishment of said actuating circuits for a certain interval of time dating from their interruption.

2. In combination, a plurality of contactors intended for operation in succession to effect certain connections in a power circuit, actuating circuits for said contactors, electromagnetic switch devices arranged to temporarily interrupt said actuating circuits between the operation of successive contactors, and means coöperating with said switch devices for preventing them from reëstablishing the actuating circuits while the current in the power circuit exceeds a certain value and until after a certain definite interval of time has elapsed dating from the interruption of said circuits.

3. In combination, a plurality of contactors intended for operation in succession to effect certain connections in a power circuit, actuating circuits for said contactors, electromagnetic switch devices arranged to temporarily interrupt said actuating circuits between the operation of successive contactors, means responsive to current in the power circuit and coöperating with said switch devices for preventing them from reëstablishing the actuating circuits while the current in the power circuit exceeds a certain value, and other means also coöperating with said switch devices for preventing the reëstablishment of said actuating circuits until after a certain definite interval of time has elapsed dating from the interruption of said circuits.

4. In combination, a plurality of contactors intended for operation in succession to effect certain connections in a power circuit, actuating circuits for said contactors, electromagnetic switch devices having actuating and holding coils respectively energized by current in said actuating circuits and current in the power circuit and arranged to temporarily interrupt said actuating circuits between the operation of successive contactors, and means coöperating with said switch devices for maintaining said actuating coils energized for a certain definite interval of time after said switch devices have interrupted an actuating circuit, whereby said actuating circuits are maintained interrupted for a certain interval of time and may then be completed immediately by said switch devices if the current in the motor circuit does not exceed a certain value.

5. In a motor control system, a plurality of contactors arranged for operation in succession for controlling the connections of the motor circuits, actuating circuits for said contactors, means operated by current in said actuating circuits and responsive to current in the motor circuit for temporarily interrupting said actuating circuits between the operation of successive contactors, and means coöperating with said last-mentioned means for preventing the reëstablishment of said actuating circuits for a certain interval of time dating from their interruption.

In witness whereof, I have hereunto set my hand this fifth day of May, 1910.

ARCHIBALD S. CUBITT.

Witnesses:
I. McCandless,
F. M. Vogel.